(12) United States Patent
Lai (10) Patent No.: US 9,308,472 B2
(45) Date of Patent: Apr. 12, 2016

(54) COMPOSITE FILTER APPARATUS (71) Applicant: Ming-Yu Lai, Taichung (TW)

(72) Inventor: Ming-Yu Lai, Taichung (TW)

( * ) Notice: Subject to any disclaimer, the term of this patent is extended or adjusted under 35 U.S.C. 154(b) by 213 days.

(21) Appl. No.: 14/155,605

(22) Filed: Jan. 15, 2014

(65) Prior Publication Data

US 2014/0202949 A1 Jul. 24, 2014

(30) Foreign Application Priority Data

Jan. 18, 2013 (TW) .............................. 102201186 U (51) Int. Cl.
| | |
|---|---|
| *B01D 15/00* | (2006.01) |
| *B01D 27/14* | (2006.01) |
| *C02F 1/50* | (2006.01) |
| *B01D 24/12* | (2006.01) |
| *C02F 1/28* | (2006.01) |
| *C02F 1/00* | (2006.01) |
| *B01D 27/02* | (2006.01) |

(52) U.S. Cl.
CPC ................. *B01D 15/00* (2013.01); *B01D 24/12* (2013.01); *B01D 27/02* (2013.01); *B01D 27/148* (2013.01); *B01D 2101/02* (2013.01); *B01D 2201/0453* (2013.01); *B01D 2201/295* (2013.01); *C02F 1/003* (2013.01); *C02F 1/283* (2013.01); *C02F 1/505* (2013.01); *C02F 2201/006* (2013.01)

(58) Field of Classification Search
CPC ........ B01D 23/14; B01D 24/12; B01D 27/02; B01D 29/0027; B01D 2101/02; B01D 2201/0453; B01D 2201/295; B01D 221/02; B01D 15/00; B01D 27/148; C02F 1/004; C02F 1/283; C02F 1/505; C02F 2201/006
USPC ...................... 210/266, 282, 285, 289, 497.01
See application file for complete search history.

(56) References Cited

U.S. PATENT DOCUMENTS

| | | | | | |
|---|---|---|---|---|---|
| 1,775,982 | A | * | 9/1930 | Waters ............... | B01D 29/0027 210/277 |
| 4,071,636 | A | * | 1/1978 | Nishino ................... | A61L 2/16 210/501 |
| 5,015,316 | A | * | 5/1991 | Ostreicher ........... | B01D 29/111 156/303.1 |
| 5,180,491 | A | * | 1/1993 | Polasky ................ | B01D 39/16 210/282 |

* cited by examiner

*Primary Examiner* — Matthew O Savage
(74) *Attorney, Agent, or Firm* — Trop, Pruner & Hu, P.C.

(57) ABSTRACT

A composite filter apparatus includes a container with a receiving space, and top and bottom openings communicated with the receiving space. A filter member includes a filter core in the receiving space, a blocking member on a top end of the filter core, and a retainer plate on a bottom end of the filter core. The receiving space is divided by the blocking member into an upper receiving space that communicates the top opening of the container, and a lower receiving space that surrounds the filter core and that communicates the bottom opening. Activated carbon particles are filled in the upper and lower receiving spaces.

8 Claims, 6 Drawing Sheets

COMPOSITE FILTER APPARATUS

CROSS-REFERENCE TO RELATED APPLICATION

This application claims priority of Taiwanese Application No. 102201186, filed on Jan. 18, 2013.

BACKGROUND OF THE INVENTION

1. Field of the Invention

The invention relates to a filter apparatus, more particularly to a composite filter apparatus for replacing filter materials in an independent manner.

2. Description of the Related Art

Figure 1:
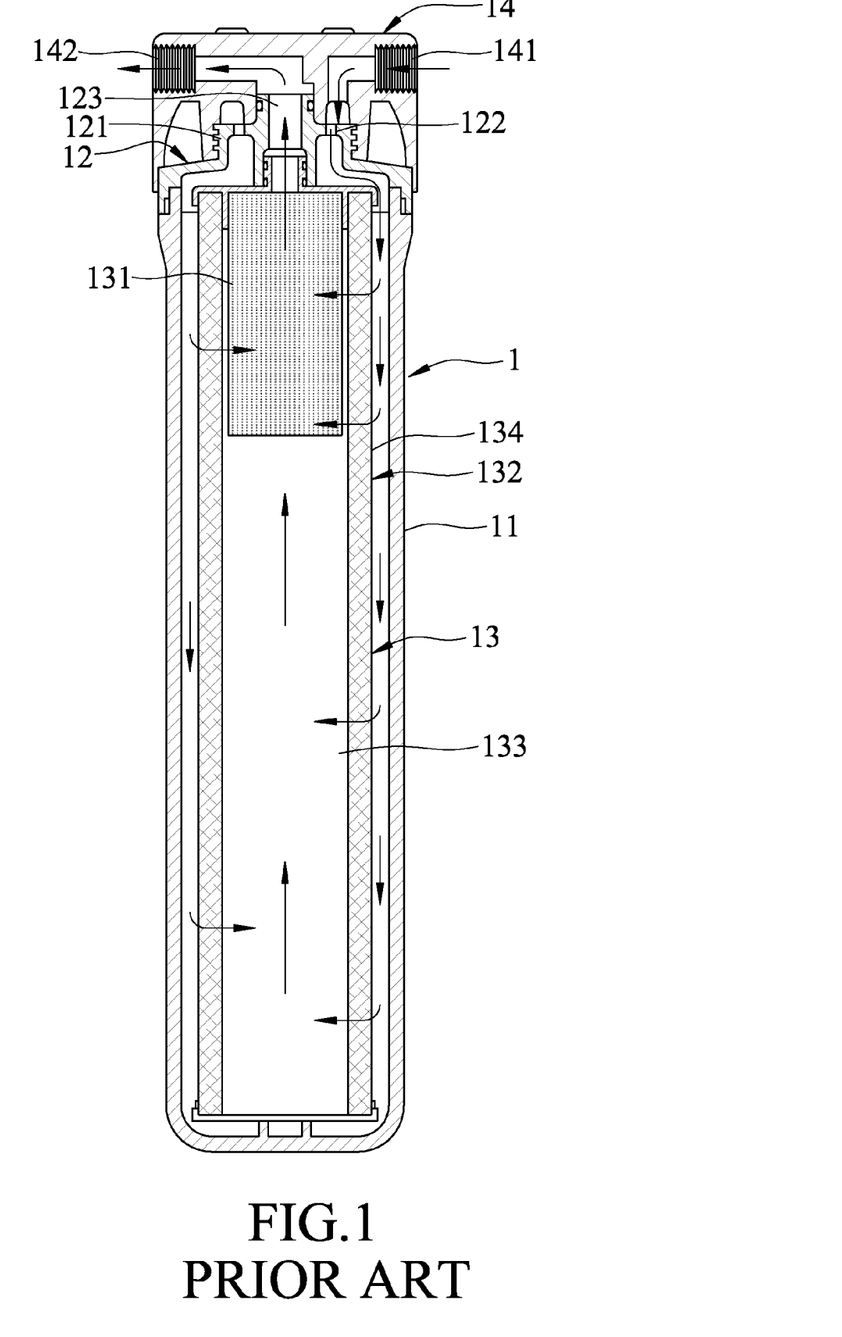
FIG. 1 is a schematic sectional view of a first conventional filter apparatus disclosed in Taiwanese Patent No. 527954.

Referring to FIG. 1, Taiwanese Patent No. 527954 discloses a first conventional filter apparatus 1. The first conventional filter apparatus 1 includes a cylinder body 11, a cylinder lid member 12 that is formed in one piece with the cylinder body 11 for sealing, an one-piece filter core 13 that is mounted below the cylinder lid member 12, and a watering seat 14 that permits water to enter thereto or to exit therefrom.

The cylinder lid member 12 has a protrusive seat 121 that is threadedly connected to the watering seat 14, a water inlet 122 that extends axially through the protrusive seat 121, and a water outlet 123 that extends axially through the protrusive seat 121 and that is distal from the water inlet 122.

The filter core 13 is mounted inside the cylinder body 11 and is connected to a bottom end of the water outlet 123 of the cylinder lid member 12. The filter core 13 has a fine-particle filtration layer 131 (such as a hollow fiber membrane), a rude-particle filtration layer 132 (such as a polypropylene fiber layer) that is sleeved on the fine-particle filtration layer 131, activated carbon particles 133 that are filled in the rude-particle filtration layer 132, and an ion exchange resin layer 134 that is coated on a surface of the rude-particle filtration layer 132 and that is fluid-permeable. Accordingly, the filter core 13 has composite filter materials.

The watering seat 14 has a water-entry opening 141 that communicates the water inlet 122 and a water-exit opening 142 that communicates the water outlet 123.

When the first conventional filter apparatus 1 is used for fluid filtration, the fluid enters the water-entry opening 141, subsequently passes through the water inlet 122 and flows into the cylinder body 11. Then, the fluid passes through the ion exchange resin layer 134, the rude-particle filtration layer 132 with the activated carbon particles 133, and the fine-particle filtration layer 131 in a successive manner. The fluid flows out the water-exit opening 142 through the water outlet 123. However, since the water-entry opening 141 and the water-exit opening 142 are both disposed on the watering seat 14, flowing of the filtered fluid out of the first conventional filter apparatus 1 through the filter core 13 is difficult, and the fluid may not be completely filtered. In addition, since the filter core 13 is configured as one-piece, the filter core 13 has to be entirely replaced even if only one of the filter materials of the filter core 13 needs substitution. As a result, the first conventional filter apparatus 1 may result in relatively high replacement cost and is uneconomical.

Figure 2:
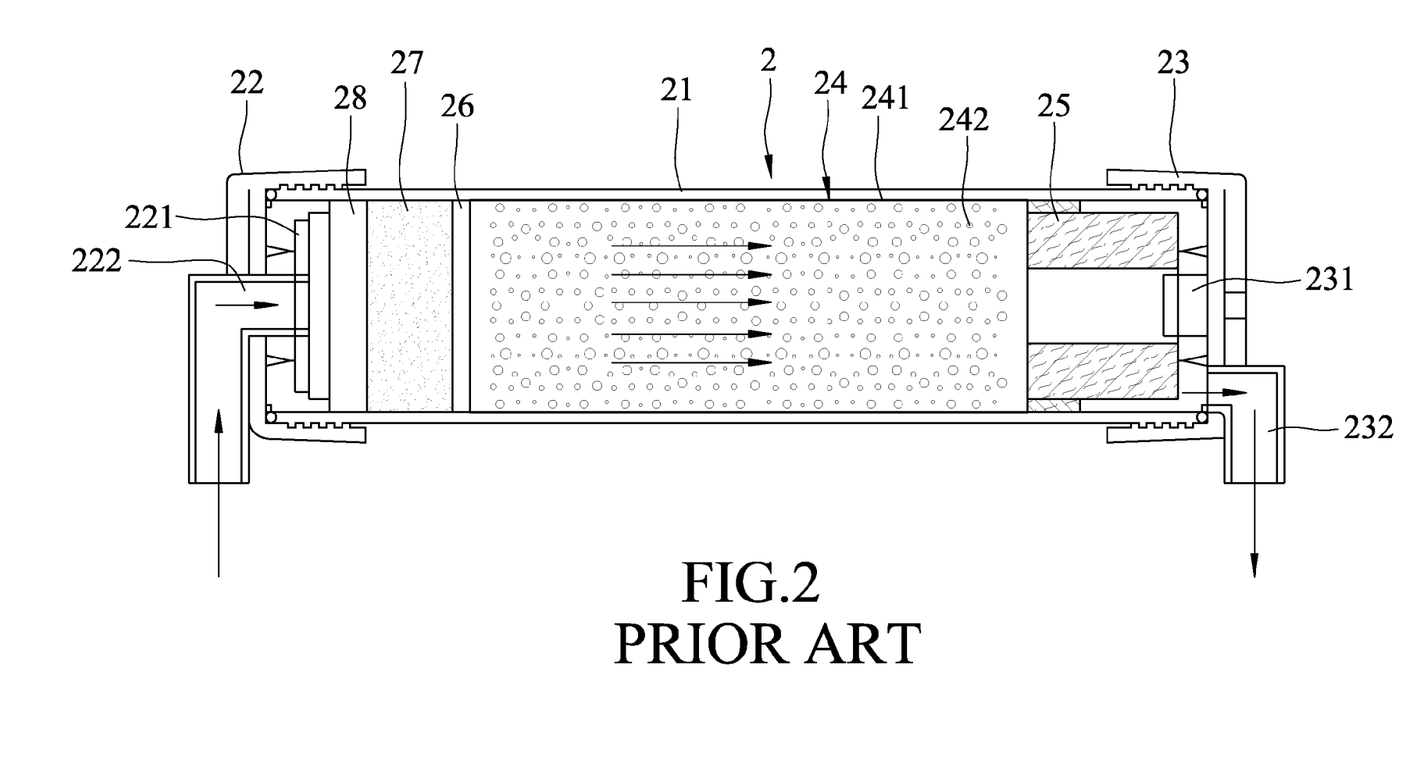
FIG. 2 is a schematic sectional view of a second conventional filter apparatus disclosed in Chinese Patent No. ZL 200720195995.7.

Referring to FIG. 2, a second conventional filter apparatus 2 disclosed in Chinese Patent No. ZL200720195995.7 includes an annular body 21, water-entry and water-exit lids 22, 23 that are respectively and threadedly connected to two end sides of the annular body 21, an activated carbon particle filter core 24 that is mounted inside the annular body 21, a polypropylene-thermal sprayed filter core 25 that is bonded to an end portion of the activated carbon particle filter core 24 and that is engaged with a first annular protrusive seat 231 of the water-exit lid 23, first and second polypropylene filter plates 26, 28 that are spaced apart from each other and that are disposed in another end portion of the activated carbon particle filter core 24, and a kinetic degradation fluxion (KDF) filter material 27 that is filled between the first and second polypropylene filter plates 26, 28. The second polypropylene filter plate 28 abuts against a second annular protrusive seat 221 of the water-entry lid 22. The water-entry lid 22 further has a water inlet 222 that is disposed at a central position of the water-entry lid 22. The water-exit lid 23 further has a water outlet 232 that is disposed at an eccentric position of the water exit lid 23. The activated carbon particle filter core 24 has a casing body 241 and activated carbon particles 242 that are disposed inside the casing body 241.

Although the second conventional filter apparatus 2 tries to improve a deficiency that requires the entire replacement of the filter core by means of a multi-layer filter material design, the activated carbon particle filter core 24 has to additionally include the casing body 241 for receiving the activated carbon particles 242, and thus the second conventional filter apparatus 2 has relatively high fabrication cost. In addition, when one of the polypropylene-thermal sprayed filter core 25 and the activated carbon particle filter core 24 needs to be replaced, they have to be replaced together in that they are bonded to each other. As a result, the second conventional filter apparatus 2 may still have relatively high replacement cost and undue wastage.

SUMMARY OF THE INVENTION

Therefore, an object of the present invention is to provide a composite filter apparatus that can alleviate the aforesaid drawbacks of the prior arts.

According to the present invention, a composite filter apparatus is adapted for filtrating an incoming fluid. The composite filter apparatus includes a container, a filter member and activated carbon particles.

The container includes an annular body that has an inner surface surrounding a receiving space, top and bottom openings that are communicated with the receiving space, and a press-fit sleeve portion that is disposed on the inner surface in proximity to the bottom opening.

The filter member is mounted inside the receiving space. The filter member includes a filter core, a blocking member that is mounted on a top end of the filter core, and a retainer plate that is mounted on a bottom end of the filter core and that is positioned inside the press-fit sleeve portion. The filter core is configured as a porous tube having an axial hole. The blocking member blocks the axial hole at the top end of the filter core. The retainer plate is transverse to the bottom end of the filter core and has a plate hole that intercommunicates with the axial hole and the bottom opening of the annular body. The receiving space is divided by the blocking member into an upper receiving space that communicates the top opening, and a lower receiving space that surrounds the filter core and that communicates the bottom opening of the annular body.

The activated carbon particles are filled in the upper and lower receiving spaces.

The fluid enters the top opening, consecutively passes through the activated carbon particles in the upper receiving space and in the lower receiving space to flow into the axial hole, and then flows through the plate hole and the bottom opening to exit the container.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 3:
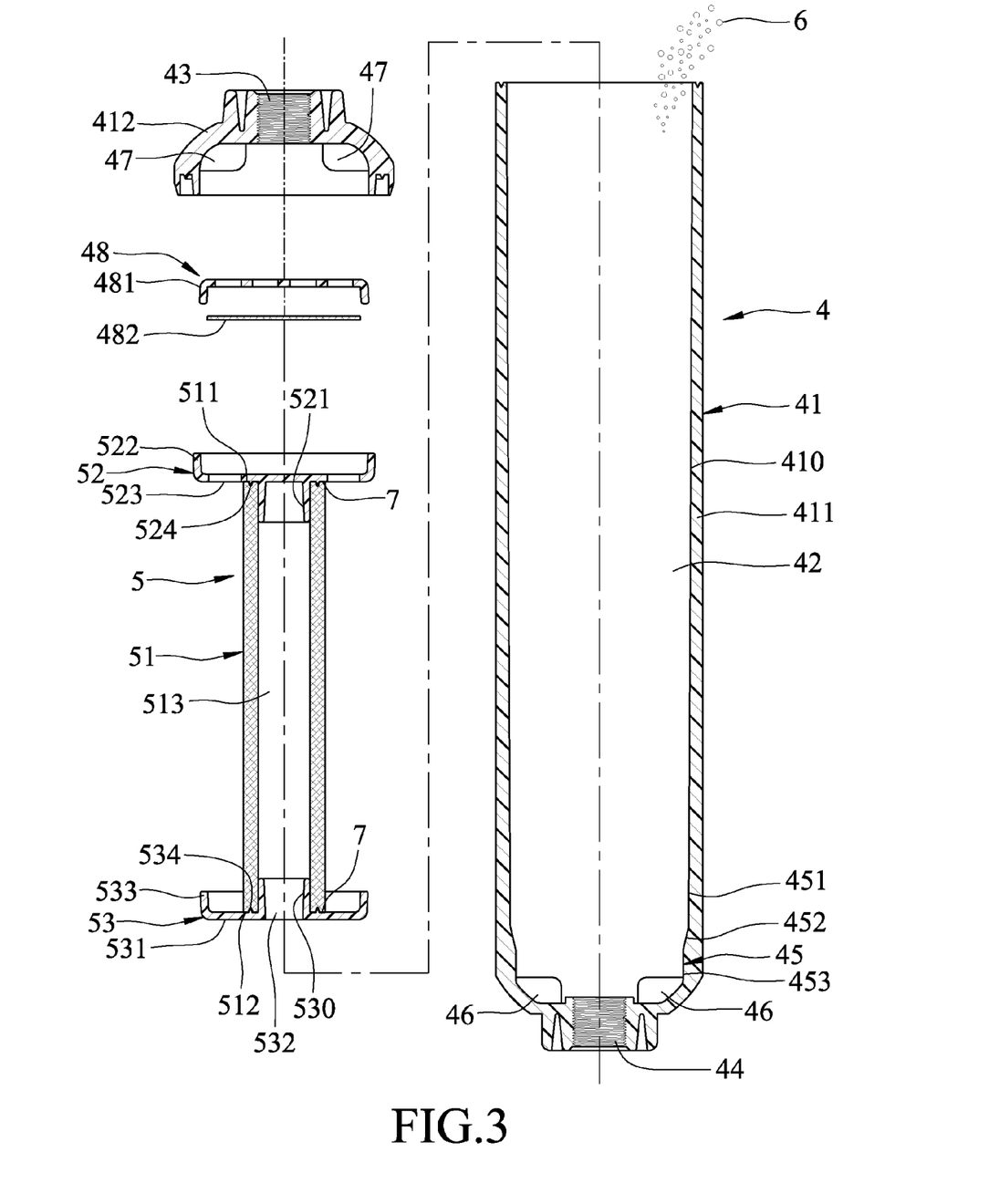
FIG. 3 is an exploded sectional view illustrating the preferred embodiment of a composite filter apparatus according to the present invention.
Figure 4:
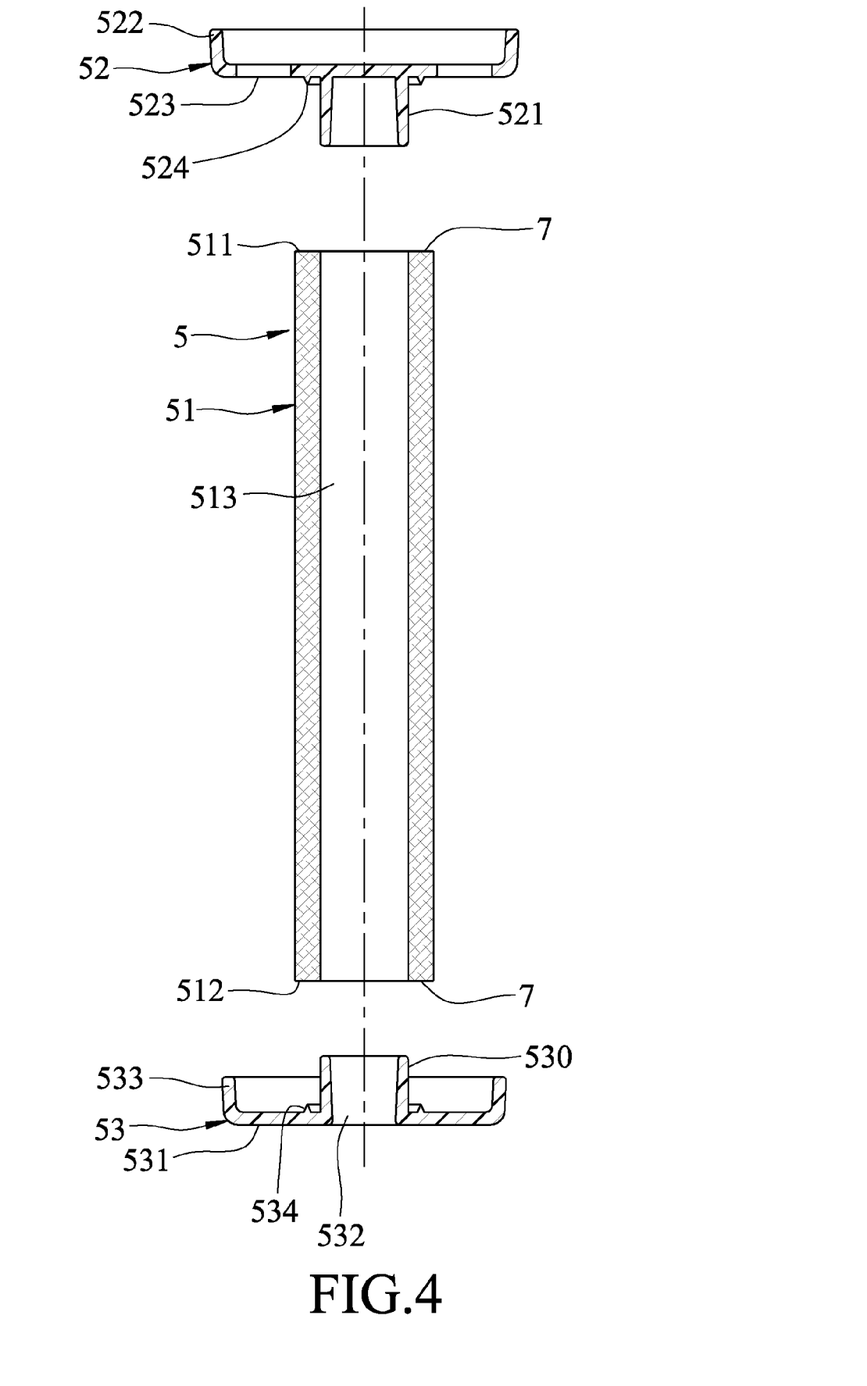
FIG. 4 is an exploded sectional view illustrating a filter member of the preferred embodiment.
Figure 5:
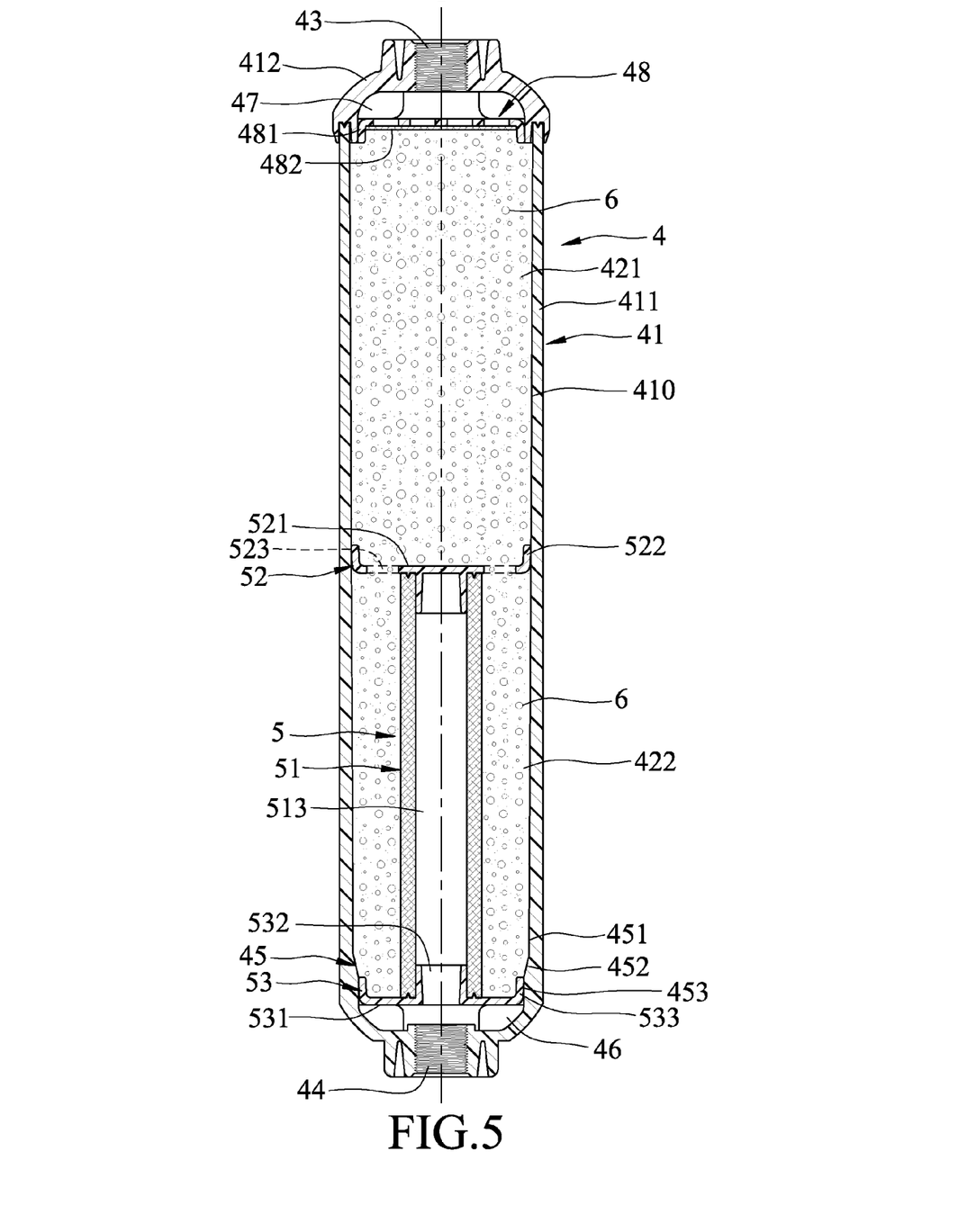
FIG. 5 is a schematic sectional view of the preferred embodiment in an assembled state.

Referring to FIGS. 3 to 5, the preferred embodiment of a composite filter apparatus according to the present invention is illustrated. The composite filter apparatus is adapted for filtrating an incoming fluid. In this preferred embodiment, the composite filter apparatus includes a container 4, a filter member 5 and activated carbon particles 6.

The container 4 includes an annular body 41 that has an inner surface 410 surrounding a receiving space 42, top and bottom openings 43, 44 that are communicated with the receiving space 42, and a press-fit sleeve portion 45 that is disposed on the inner surface 410 in proximity to the bottom opening 44.

In this preferred embodiment, the annular body 41 is in a form of a tubular shape. The container 4 further includes a top lid 412 that is disposed on a top open end of the annular body 41. The top opening 43 is formed centrally on the top lid 412. The bottom opening 44 is formed centrally in a bottom wall of the annular body 41.

The press-fit sleeve portion 45 of the container 4 has an enlarged section 451, a narrowed section 453 that is lower than the enlarged section 451, and a guiding section 452 that interconnects the enlarged and narrowed sections 451, 453. The narrowed section 453 is proximate to the bottom wall of the annular body 41.

Preferably, the container 4 further includes a plurality of supporting ribs 46 that protrude upwardly into the narrowed section 453 from the bottom wall of the annular body 41.

In addition, the container 4 further includes a plurality of abutting ribs 47 that are formed inside the top lid 412 in an annularly spaced apart manner, and a barrier member 48. The barrier member 48 has a perforated cap 481 that is disposed inside the top lid 412 to cover the top opening 43 and to block the activated carbon particles 6 and that abut against the abutting ribs 47, and a barrier cloth 482 that lines the perforated cap 481. In this preferred embodiment, the barrier cloth 482 includes sterilizing silver ions.

The filter member 5 is axially mounted inside the receiving space 42. The filter member 5 includes a filter core 51, a blocking member 52 that is mounted on a top end 511 of the filter core 51, and a retainer plate 53 that is mounted on a bottom end 512 of the filter core 51 and that is positioned inside the press-fit sleeve portion 45.

In this preferred embodiment, the filter core 51 is a polypropylene-thermal sprayed filter core that is configured as a porous tube having an axial hole 513.

The blocking member 52 blocks the axial hole 513 at the top end 511 of the filter core 51. In this preferred embodiment, the blocking member 52 has a plug body 521 that is inserted into the axial hole 513 at the top end 511 of the filter core 51, an abutment ring 522 that radially extends from the plug body 521 and that abuts against the inner surface 410 of the annular body 41, and a plurality of through holes 523 that extend axially through the abutment ring 522. Preferably, the blocking member 52 further has a first protrusive ring 524 that protrudes from a bottom surface of the abutment ring 522 around the plug body 521 to squeeze into a surface of the top end 511 of the filter core 51.

The retainer plate 53 is transverse to the bottom end 512 of the filter core 51 and has a plate hole 532 that intercommunicates with the axial hole 513 and the bottom opening 44 of the annular body 41. Preferably, the retainer plate 53 further has a insert part 530 that is inserted into the bottom end 512 of the filter core 51, an annular part 531 that extends radially from the insert part 530 and that abuts against the bottom end 512 of the filter core 51, a press-fit rim 533 that upwardly extends from a peripheral end of the annular part 531 and that is press-fitted in the press-fit sleeve portion 45 of the container 4, and a second protrusive ring 534 that protrudes from a top surface of the annular part 531 around the insert part 530 to squeeze into a surface of the bottom end 512 of the filter core 51. In this preferred embodiment, the plate hole 532 is formed axially in the insert part 530. The supporting ribs 46 of the container 4 can press the retainer plate 53 against the bottom end 512 of the filter core 51. The press-fit rim 533 of the retainer plate 53 is fitted in the narrowed section 453 of the press-fit sleeve portion 45 and is seated on the supporting ribs 46.

While the filter core 51 is permeable, the non-permeable first and second protrusive rings 524, 534 respectively prevent the fluid from axially flowing and passing through the top and bottom ends 511, 512 of the filter core 51. Preferably, the composite filter further includes an adhesive material 7 that is disposed between the top end 511 of the filter core 51 and the blocking member 52 and between the bottom end 512 of the filter core 51 and the retainer plate 53. As a result, the filter core 51, the blocking member 52 and the retainer plate 53 are assembled together to form the filter member 5 in an adhesion manner. However, the adhesive material 7 can be omitted as long as the filter core 51, the blocking member 52 and the retainer plate 53 are assembled in a tight manner.

In this preferred embodiment, the receiving space 42 is divided by the blocking member 52 into an upper receiving space 421 that communicates the top opening 43 of the container 4, and a lower receiving space 422 that surrounds the filter core 51 and that communicates the bottom opening 44 of the annular body 41.

In this preferred embodiment, the activated carbon particles 6 are filled in the upper and lower receiving spaces 421, 422. In actual use, the activated carbon particles 6 absorb components of the fluid that are harmful to health, such as chlorine compounds, odors, pesticide residues, etc.

During assembly, the filter member 5 is first pushed downwardly and inserted into the receiving space 42 of the container 4. When the retainer plate 53 is pushed downwardly past the press-fit sleeve portion 45, the retainer plate 53 is press-fitted in the narrowed section 453 by virtue of a design of the guiding section 452. When the press-fit rim 533 of the retainer plate 53 is press-fitted in the narrowed section 453, the retainer plate 53 is seated on the supporting ribs 46 so as to be firmly positioned in the press-fit sleeve portion 45. In addition, since the abutment ring 522 of the blacking member 52 abuts against the inner surface 410 of the annular body 41, the filter member 5 is motionlessly positioned inside the container 4. Then, the activated carbon particles 6 are filled in the upper receiving space 421. By gravitational attraction, the activated carbon particles 6 automatically pass through the through holes 523 of the blocking member 52 so as to be filled in the lower receiving space 422. Finally, the top lid 412 is tightly mounted on the top open end of the annular body 41.

Figure 6:
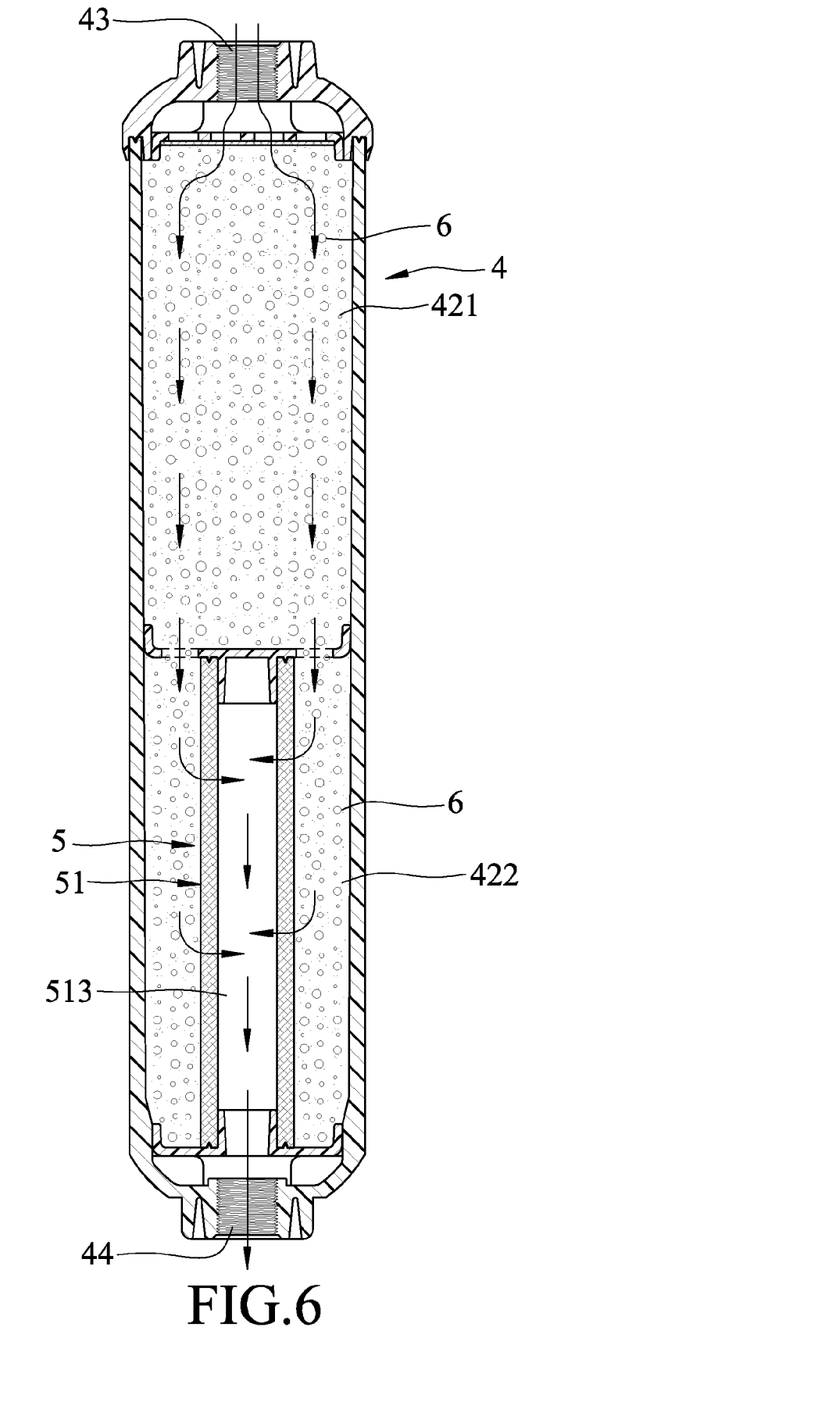
FIG. 6 is a schematic sectional view illustrating the preferred embodiment of the filter apparatus when in use.

Referring to FIG. 6, in actual use, the fluid enters the top opening 43, consecutively passes through the activated carbon particles 6 for filtration in the upper receiving space 421 and in the lower receiving space 422 to flow into the axial hole 513, and then flows through the plate hole 532 and the bottom opening 44 to exit the container 4.

To sum up, the composite filter apparatus of the present invention provides the following advantages:

1. According to the present invention, the composite filter apparatus is capable of sufficiently purifying the incoming fluid with relatively high quality.

2. The filter member 5 and the activated carbon particles 6 are independently received in the container 4 and are able to be replaced independently. Hence, the composite filter apparatus can have relatively low replacement cost and unnecessary waste of materials is prevented so as to save maintenance cost.

3. By virtue of directly filling the activated carbon particles 6 in the upper and lower receiving spaces 421, 422, the numbers of components of the composite filter apparatus can be reduced and the fabrication cost thereof is reduced accordingly.

4. When the composite filter apparatus is in an upside down position, the barrier cloth 482 of the barrier member 48 prevents the activated carbon particles 6 from passing out of the top opening 43.

5. The barrier cloth 482 with silver ions is capable of sterilizing the fluid that enters therethrough.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A composite filter apparatus adapted for filtrating an incoming fluid, comprising:
    a container including an annular body that has an inner surface surrounding a receiving space, top and bottom openings that are communicated with said receiving space, and a press-fit sleeve portion that is disposed on said inner surface in proximity to said bottom opening;
    a filter member mounted inside said receiving space, said filter member including a filter core, a blocking member that is mounted on a top end of said filter core, and a retainer plate that is mounted on a bottom end of said filter core and that is positioned inside said press-fit sleeve portion, said filter core being configured as a porous tube having an axial hole, said blocking member blocking said axial hole at said top end of said filter core, said retainer plate having an annular part that is transverse to said bottom end of said filter core and a plate hole that intercommunicates with said axial hole and said bottom opening of said annular body, said receiving space being divided by said blocking member into an upper receiving space that communicates said top opening of said container, and a lower receiving space that surrounds said filter core and that communicates said bottom opening of said annular body; and
    activated carbon particles filled in said upper and lower receiving spaces;
    wherein said blocking member has a plug body that is inserted into said axial hole at said top end of said filter core, an abutment ring that radially extends from said plug body and that abuts against said inner surface of said annular body, and a plurality of through holes that extend axially through said abutment ring; and
    wherein the fluid enters said top opening, consecutively passes through said activated carbon particles in said upper receiving space and in said lower receiving space to flow into said axial hole, and then flows through said plate hole and said bottom opening to exit said container.

2. The composite filter apparatus as claimed in claim 1, wherein said blocking member further has a first protrusive ring that protrudes from a bottom surface of said abutment ring around said plug body to squeeze into a surface of said top end of said filter core, said retainer plate further including a second protrusive ring that protrudes from a top surface of said annular part around said hollow insert part to squeeze into a surface of said bottom end of said filter core.

3. The composite filter apparatus as claimed in claim 1, further comprising an adhesive material that is disposed between said top end of said filter core and said blocking member and between said bottom end of said filter core and said retainer plate.

4. A composite filter apparatus adapted for filtrating an incoming fluid, comprising,
    a container including an annular body that has an inner surface surrounding a receiving space, top and bottom openings that are communicated with said receiving space, and a press-fit sleeve portion that is disposed on said inner surface in proximity to said bottom opening;
    a filter member mounted inside said receiving space, said filter member including a filter core, a blocking member that is mounted on a top end of said filter core, and a retainer plate that is mounted on a bottom end of said filter core and that is positioned inside said press-fit sleeve portion, said filter core being configured as a porous tube having an axial hole, said blocking member blocking said axial hole at said top end of said filter core, said retainer plate having an insert part that is inserted into said bottom end of said filter core, an annular part that extends radially from said insert part and that abuts against said bottom end of said filter core, a press-fit rim that upwardly extends from a peripheral end of said annular part and that is press-fitted in said press-fit sleeve portion of said container, and a plate hole that is formed axially in said insert part and that intercommunicates with said and said bottom opening of said annular body, said receiving space being divided by said blocking member into an upper receiving space that communicates said top opening of said container, and a lower receiving space that surrounds said filter core and that communicates said bottom opening of said annular body;
    activated carbon particles filled in said upper and lower receiving spaces;
    wherein the fluid enters said top opening, consecutively passes through said activated carbon particles in said upper receiving space and in said lower receiving space to flow into said axial hole, and then flows through said plate hole and said bottom opening to exit said container.

5. The composite filter apparatus as claimed in claim 4, wherein said container further includes a top lid that is disposed on a top open end of said annular body, said top opening being formed centrally on said top lid, said bottom opening being formed centrally in a bottom wall of said annular body, said container further including a plurality of abutting ribs that are formed inside said top lid in an annularly spaced apart manner, and a barrier member, said barrier member having a perforated cap that is disposed inside said top lid to cover said top opening and that abuts against said abutting ribs, and a barrier cloth that lines said perforated cap.

6. The composite filter apparatus as claimed in claim 5, wherein said barrier cloth includes a sterilizing silver ion.

7. The composite filter apparatus as claimed in claim 5, wherein said press-fit sleeve portion of said container has an enlarged section, a narrowed section that is lower than said enlarged section, and a guiding section that interconnects said enlarged and narrowed sections, said narrowed section being proximate to said bottom wall of said annular body, said container further including a plurality of supporting ribs that protrude upwardly into said narrowed section from said bottom wall of said annular body.

8. The composite filter apparatus as claimed in claim 7, wherein said press-fit rim of said retainer plate is fitted in said narrowed section of said press-fit sleeve portion and is seated on said supporting ribs.

\* \* \* \* \*